(12) United States Patent
Quintana Sanchez et al.

(10) Patent No.: US 11,431,410 B2
(45) Date of Patent: Aug. 30, 2022

(54) FREE SPACE OPTICAL COMMUNICATIONS TERMINAL

(71) Applicant: AIRBUS SAS, Blagnac (FR)

(72) Inventors: Crisanto Quintana Sanchez, Bristol (GB); Gavin Erry, Bristol (GB); Yoann Thueux, Bristol (GB)

(73) Assignee: AIRBUS (SAS), Blagnac (FR)

( * ) Notice: Subject to any disclaimer, the term of this patent is extended or adjusted under 35 U.S.C. 154(b) by 0 days.

(21) Appl. No.: 17/459,696

(22) Filed: Aug. 27, 2021

(65) Prior Publication Data

US 2022/0140900 A1 May 5, 2022

(30) Foreign Application Priority Data

Oct. 29, 2020 (GB) ...................................... 2017188

(51) Int. Cl.
| | |
|---|---|
| *H04B 10/11* | (2013.01) |
| *H04B 10/532* | (2013.01) |
| *H04B 10/70* | (2013.01) |

(52) U.S. Cl.
CPC .......... *H04B 10/11* (2013.01); *H04B 10/532* (2013.01); *H04B 10/70* (2013.01)

(58) Field of Classification Search
None
See application file for complete search history.

(56) References Cited

U.S. PATENT DOCUMENTS 6,289,104 B1 * 9/2001 Patterson .............. H04L 9/0858
398/40
9,800,352 B2 * 10/2017 Frohlich ................ H04B 10/70
(Continued)

FOREIGN PATENT DOCUMENTS

| CN | 106789048 | 5/2017 |
|---|---|---|
| EP | 3 337 063 | 6/2018 |

(Continued)

OTHER PUBLICATIONS

P. Sibson, et al., "Chip-Based Quantum Key Distribution", Nature Communications, DOI: 10.1038/ncomms13984, published Feb. 9, 2017, 6 pages.

(Continued)

*Primary Examiner* — Jai M Lee
(74) *Attorney, Agent, or Firm* — Nixon & Vanderhye P.C.

(57) ABSTRACT

A free space optical communications transmitter terminal including an optical source arranged to provide a first beam of light encoding information to be communicated; an optical source arranged to provide photons encoding bits of a key of a Quantum Key Distribution protocol; and an optics arrangement. The first beam and the photons are linearly polarised. The optics arrangement is configured to combine the first beam and the photons into a single, second, beam to be transmitted to a receiver terminal; and transform the linear polarisation of the first beam into one of left and right circular polarisation and transform the linear polarisation of the photons into the other of left and right circular polarisation. A receiver terminal receives the second beam, transforms the circular polarisations into orthogonal linear polarisations, and filters out the linear polarisation of the first beam to allow the photons to pass to a single photon detector.

24 Claims, 4 Drawing Sheets

(56) References Cited

U.S. PATENT DOCUMENTS

| | | | |
|---|---|---|---|
| 9,866,379 B2* | 1/2018 | Nordholt | H04B 10/70 |
| 10,887,093 B2* | 1/2021 | Li | G06N 10/00 |
| 10,999,069 B2* | 5/2021 | Legré | H04B 10/70 |
| 11,170,318 B2* | 11/2021 | Ashrafi | G02F 3/00 |
| 2012/0002968 A1 | 1/2012 | Luo et al. | |
| 2016/0127073 A1 | 5/2016 | Ashrafi et al. | |
| 2019/0394030 A1* | 12/2019 | Forbes | H04B 10/50 |
| 2020/0059358 A1* | 2/2020 | Legré | H04L 9/0852 |
| 2021/0119787 A1* | 4/2021 | Huberman | H04B 10/50 |

FOREIGN PATENT DOCUMENTS

| | | |
|---|---|---|
| EP | 3 692 657 | 8/2020 |
| WO | 2018/065393 | 4/2018 |
| WO | 2018/134799 | 7/2018 |
| WO | 2018/161733 | 9/2018 |
| WO | 2019/087029 | 5/2019 |

OTHER PUBLICATIONS

Yongxiong Ren, et al., "Spatially Multiplexed Orbital Angular Momentum-Encoded Photon and Classical Channels in a Free-space Optical Communication Link", Optics Letters, The Optical Society, published Nov. 22, 2017, 5 pages.

* cited by examiner

FREE SPACE OPTICAL COMMUNICATIONS TERMINAL

RELATED APPLICATION

This application claims priority to and incorporates by reference in its entirety United Kingdom Patent Application GB 2017188.0 filed Oct. 29, 2020.

TECHNICAL BACKGROUND

The present disclosure relates to a free space optical communications terminal.

BACKGROUND

Free space optical (FSO) communications is an optical communications technique that uses light propagating in free space to wirelessly transmit data. In the context of FSO communications, 'free space' refers to, for example, air, space, vacuum, or similar and is in contrast with communications via solids such as a fiber-optic cable. FSO communications can be useful for example in cases where communication via physical connections, such as fiber-optic cables or other data cables, is impractical. One such case is, for example, communications between an aircraft such as a drone and a ground-based terminal. An FSO transmitter terminal modulates an optical beam to carry information to an FSO receiver terminal. If the optical beam is intercepted by an eavesdropper, there is a risk the modulation can be decoded by the eavesdropper to gain knowledge of the carried information.

The security of communications can be improved by encrypting carried data in accordance with a secret key known only to the transmitter and receiver terminals. A technique of producing and/or sharing such a secret key between terminals is Quantum Key Distribution (QKD), whereby quantum states of single photons sent from a transmitter terminal to a receiver terminal are used to encode the secret key. QKD allows the communicating terminals to detect the presence of an eavesdropper attempting to gain knowledge of the secret key. This is because of the fundamental property of quantum mechanics that measurement of a quantum system alters the state of the system. If no alteration is detected then a secure key is generated, whereas if alteration is detected then the presence of an eavesdropper can be inferred, and the communication can be aborted.

SUMMARY

According to a first aspect of the present invention, there is provided a free space optical communications transmitter terminal comprising: a first optical source arranged to provide a first beam of light encoding information to be communicated, the first beam having a first linear polarization; a second optical source arranged to provide photons encoding bits of a key of a Quantum Key Distribution protocol, the photons having a second linear polarization; and a first optics arrangement configured to: combine the first beam and the photons into a single, second, beam to be transmitted to a target; and transform the first linear polarization of the first beam into one of left and right circular polarization and transform the second linear polarization of the photons into the other of left and right circular polarization.

Optionally, the first beam has a first wavelength and the photons have a second wavelength different to the first wavelength.

Optionally, a difference in wavelength between the first wavelength and the second wavelength is in the range 10 nm to 30 nm.

Optionally, the second linear polarization is orthogonal to the first linear polarization.

Optionally, the first optics arrangement comprises a quarter wave plate onto which the second beam is incident in use and arranged to transform the first linear polarization into one of left and right circular polarization and transform the second linear polarization into the other of left and right circular polarization.

Optionally, the terminal further comprises a further optics arrangement configured to modify the second optical beam from the first optical arrangement for transmission to said target.

Optionally, the further optics arrangement comprises one or more of conditioning optics, fast steering optics, and beam expanding optics.

Optionally, the first optical source is arranged to encode a synchronization signal for use in the Quantum Key Distribution protocol onto the first beam.

According to a second aspect of the present invention, there is provided a free space optical communications receiver terminal comprising: a receiver arranged to receive a second beam comprising a first beam of light encoding information being communicated and photons encoding bits of a key of a Quantum Key Distribution protocol, the first beam having a first circular polarization and the photons having a second circular polarization, the first circular polarization being one of right and left circular polarization and the second circular polarization being the other of right and left circular polarization; a second optics arrangement configured to transform the first circular polarization of the first beam into a first linear polarization and transform the second circular polarization of the photons into a second linear polarization, the first linear polarization being orthogonal to the second linear polarization; and filter the second linear polarization from the first linear polarization so as to filter out the first beam from the second beam and allow the photons encoding the bits of the key of the Quantum Key Distribution protocol to pass; and a single photon detector arranged to detect the photons encoding the bits of the key of the Quantum Key Distribution protocol allowed to pass by the second optics arrangement.

Optionally, the first beam has a first wavelength and the photons have a second wavelength different from the first wavelength, and the second optics arrangement comprises a wavelength filter arrangement to filter out the first wavelength from the second beam and allow the second wavelength to pass.

Optionally, the wavelength filter arrangement is configured to filter out background light from the second beam.

Optionally, the wavelength filter arrangement comprises a two-stage wavelength division multiplexing filter to filter out background light and the first beam from the second beam and allow the photons to pass.

Optionally, the first wavelength differs from the second wavelength in the range 10 nm to 30 nm, and the second optics arrangement is shared by the first beam and the photons of the second beam.

Optionally, the second optics arrangement comprises a quarter wave plate onto which the received second beam is incident in use and arranged to transform the first circular polarization of the first beam into the first linear polarization and transform the second circular polarization of the photons into the second linear polarization.

Optionally, the second optics arrangement comprises a polarization filter to filter the second linear polarization from the first linear polarization.

Optionally, the second optics arrangement comprises a beam splitter to route a portion of the received second beam to a further detector arranged to detect the first beam.

Optionally, terminal comprises the further detector and a decoder, wherein the decoder is arranged to decode from the detected first beam a synchronization signal for use in the Quantum Key Distribution protocol.

Optionally, the Quantum Key Distribution protocol is based on one or both of time bin encoding and phase shift encoding.

According to a third aspect of the present invention, there is provided a free space optical communications system comprising the free space optical communications transmitter terminal according to the first aspect and the free space optical communications receiver terminal according to the second aspect.

According to a fourth aspect of the present invention, there is provided a vehicle comprising the free space optical communications transmitter terminal according to the first aspect and/or the free space optical communications receiver terminal according to the second aspect.

Optionally, the vehicle is one or both of an aircraft and a spacecraft.

According to a fifth aspect of the present invention, there is provided a method for free space optical communications, the method comprising: generating a first beam of light encoding information to be communicated, the first beam having a first linear polarization; generating photons encoding bits of a key of a Quantum Key Distribution protocol, the photons having a second linear polarization; combining the first beam and the photons into a single, second, beam to be transmitted to a target; and transforming the first linear polarization of the first beam into one of left and right circular polarization and transforming the second linear polarization of the photons into the other of left and right circular polarization.

According to a sixth aspect of the present invention, there is provided a method for free space optical communications, the method comprising: receiving a second beam comprising a first beam of light encoding information being communicated and photons encoding bits of a key of a Quantum Key Distribution protocol, the first beam having a first circular polarization and the photons having a second circular polarization, the first circular polarization being one of right and left circular polarization and the second circular polarization being the other of right and left circular polarization; transforming the first circular polarization of the first beam into a first linear polarization and transforming the second circular polarization of the photons into a second linear polarization, the first linear polarization being orthogonal to the second linear polarization; and filtering the second linear polarization from the first linear polarization so as to filter out the first beam from the second beam and allow the photons encoding the bits of the key of the Quantum Key Distribution protocol to pass; and detecting the photons encoding the bits of the key of the Quantum Key Distribution protocol allowed to pass.

According to a seventh aspect of the present invention, there is provided a method of free space optical communications, the method comprising: at a first terminal: generating a first beam of light encoding information to be communicated, the first beam having a first linear polarization; generating photons encoding bits of a key of a Quantum Key Distribution protocol, the photons having a second linear polarization; combining the first beam and the photons into a single, second, beam; transforming the first linear polarization of the first beam into one of left and right circular polarization and transforming the second linear polarization of the photons into the other of left and right circular polarization; and transmitting the second beam to a second terminal; and at the second terminal: receiving the second beam; transforming the first circular polarization of the first beam into a first linear polarization and transforming the second circular polarization of the photons into a second linear polarization, the first linear polarization being orthogonal to the second linear polarization; filtering the second linear polarization from the first linear polarization so as to filter out the first beam from the second beam and allow the photons encoding the bits of the key of the Quantum Key Distribution protocol to pass; and detecting the photons encoding the bits of the key of the Quantum Key Distribution protocol allowed to pass.

According to an eighth aspect of the present invention, there is provided a free space optical communications transmitter terminal comprising: a first optical source arranged to provide a first beam of light encoding information to be communicated, the first beam of light having a first wavelength; and a second optical source arranged to provide photons encoding bits of a key of a Quantum Key Distribution protocol, the photons having a second wavelength; wherein a difference in wavelength between the first wavelength and the second wavelength is in the range 10 nm to 30 nm.

Further features and advantages of the invention will become apparent from the following description of preferred embodiments of the invention, given by way of example only, which is made with reference to the accompanying drawings. As used herein, like features are denoted by like reference signs.

DETAILED DESCRIPTION

Figure 1:
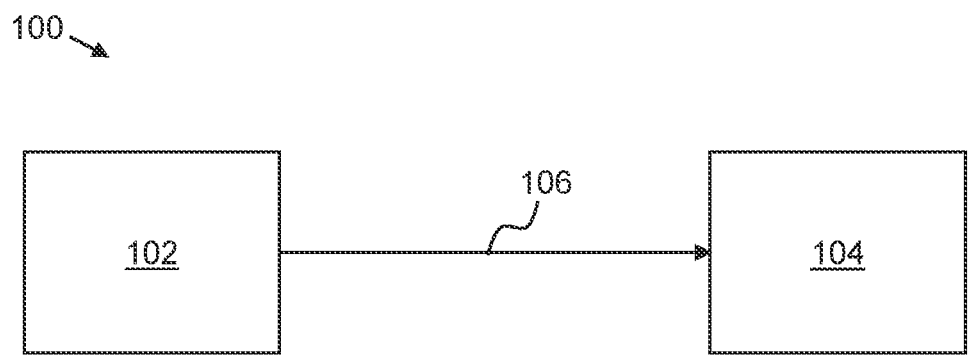
FIG. 1 is a schematic diagram illustrating a free space optical (FSO) communications system.

Referring to FIG. 1, a free space optical (FSO) communications system 100 comprises a FSO communications transmitter terminal 102 (referred to hereinafter as a transmitter terminal 102), and a FSO communications receiver terminal 104 (referred to hereinafter as a receiver terminal 104). The transmitter terminal 102 emits or transmits an optical beam 106 towards the receiver terminal 104, and the receiver terminal 104 receives the optical beam 106. It will be appreciated that in some examples the FSO communications transmitter terminal 102 may also comprise the components and/or functionality of the FSO communications receiver terminal 104 and vice versa. This may enable two-way FSO communications between the terminals 102, 104.

In examples described herein, the optical beam 106 comprises both a first beam of light encoding information to be communicated from the transmitter terminal 102 to the receiver terminal 104, and photons encoding bits of a key of a Quantum Key Distribution (QKD) protocol. For example, the photons encoding bits of a key of a Quantum Key Distribution (QKD) protocol (also referred to herein as QKD photons) may be used to produce or share a secret key between the transmitter terminal 102 and the receiver terminal 104, and the secret key may be used to encrypt and decrypt the information encoded onto the first beam. This may enable secure FSO communications between the transmitter 102 and the receiver 104.

Combining the first beam and the QKD photons in a single optical beam 106 provides efficiencies but also presents challenges. For example, combining the first beam and the QKD photons into the single optical beam 106 allows the transmitter terminal 102 to transmit the beam via a single aperture and/or using a single pointing system to direct the single beam towards the receiver terminal 104. Similarly, this may allow the receiver terminal 104 to receive the optical beam via a single aperture or receiver. This may reduce the weight and space of the transmitter terminal 102 and/or receiver terminal 104. On the other hand, combining the first beam and the QKD photons in a single optical beam 106 presents challenges in that it can be difficult to detect the single QKD photons amongst the background of the relatively high power first beam. For example, implementation of a QKD protocol may have between 30 dB and 70 dB separation between the channel carrying the information via the first beam (also referred to as the classical channel), and the QKD bits encoded by the QKD photons (also referred to as the QKD channel).

One way to achieve sufficient separation between the classical channel and the QKD channel would be to use very different wavelengths for the QKD photons and the first beam, for example wavelengths differing by more than 100 nm, for example 1550 nm and 1064 nm. However, such an approach would suffer from two main drawbacks. The first drawback is that, in the context of FSO communications, the first beam and the QKD photons may travel through an inhomogeneous atmosphere, such as air or space with varying refractive index. If the first beam and the QKD photons had very different wavelengths, then as the second beam propagates through parts of the atmosphere having differing refractive indices, the first beam and the QKD photons would refract very differently (e.g. with different refraction angles) and hence may not both effectively or precisely reach the receiver. This may, for example, limit the effectiveness and/or range of the system. The second drawback is that FSO communications bulk optics can be wavelength dependent, for example may only be used or effective in a certain wavelength range. For example, for the transmitter, the bulk optics may include optics used for transmission of the optical beam to the receiver, such as beam conditioning optics, fast steering optics, and beam expanding optics. Using very different wavelengths for the first beam and the QKD photons may therefore require separate such bulk optics to be provided for each of the first beam and the QKD photons, which may add to the weight and space of the terminal. This can be a particular issue for implementation in vehicles, especially in aircraft such as drones and/or spacecraft such as satellites, where space and/or weight of components is to be kept to a minimum, for example to enable the vehicles to operate effectively.

To address these issues, in broad overview, according to aspects of the invention, separation between the classical channel and the QKD channel is provided at least in part by, at the transmitter 102, circularly polarizing the first beam according to one of left and right hand circular polarization and circularly polarizing the QKD photons according to the other of left and right hand circular polarization. Optics at the receiver 104 can then transform the circular polarizations into orthogonal linear polarizations (e.g. using a quarter wave plate) and apply filtering (e.g. using a linear polarizer) to filter out the first beam and allow the QKD photons to pass to a single photon detector. This may help provide sufficient separation between the QKD channel and the classical channel without requiring very different wavelengths to be used for the first beam and the QKD photons. As such, this technique allows for similar wavelengths to be used for the first beam and the QKD photons (e.g. differing in the range 10 nm to 30 nm, for example 20 nm). This may, in turn, allow for similar propagation of the first beam and the QKD photons through the atmosphere, and hence that both the first beam and the QKD photos may more effectively and/or precisely reach the receiver. This may, in turn, improve the effectiveness and/or the range of the system. Further, allowing for similar wavelengths to be used for the first beam and the QKD photons may allow bulk optics of the transmitter terminal 102 and/or the receiver terminal 104 to be shared by or common to the first beam and QKD photons. For example, for the transmitter terminal 102, the bulk optics may include optics used for transmission of the optical beam to the receiver, such as beam conditioning optics, fast steering optics, and beam expanding optics, and these may be shared by or common to the first beam and the QKD photons. This may in turn reduce the weight and or space of the FSO communication terminals 102, 104, which can be particularly important for implementation in vehicles, especially in aircraft such as drones and/or spacecraft such as satellites, where space and/or weight of components is to be kept to a minimum, for example to enable the vehicles to operate effectively.

Circularly polarizing the first beam according to one of left and right hand circular polarization and circularly polarizing the QKD photons according to the other of left and right hand circular polarization may also allow for the channel separation in a way that is robust or invariant to a direction or orientation of the receiver terminal 104 relative to the transmitter terminal 102, which in FSO communications may not be fixed or fixable. In other words, the left or right handed nature of the respective polarized light, and hence the separation between the channels to which those circular polarizations are respectively applied, is independent of the relative positions and orientations of the transmitter terminal 102 and receiver terminal 104. This may be particularly important where one or both of the FSO transmitter terminal 102 and the FSO receiver terminal 104 are implemented in moving objects such as vehicles such as aircraft and/or spacecraft.

As mentioned, the wavelength of the first beam and the QKD photons may be similar, for example differ by a relatively small amount, for example differ in the range 10 nm to 30 nm, for example differ by 20 nm. In some examples, the receiver terminal 104 additionally comprises a wavelength filter arrangement (for example comprising two wavelength filters) to filter out the wavelength associated with the first beam (and background) and allow the wavelength associated with the QKD photons to pass. This may be used in addition to the polarization filtering to further increase the separation between the classical channel and the QKD channel. This combination may allow for even more effective separation of the QKD and classical channels while using similar wavelengths for the first beam and the QKD photons and hence retaining the advantages of similar propagation through the atmosphere and sharing of bulk optics. The inventors have found that a range of wavelength difference that provides for particularly effective channel separation (e.g. 70 dB) through use of the combination of polarization filtering and wavelength filtering mentioned above, while still enabling good atmospheric propagation similarity and effective sharing of bulk optics, is 10 nm to 30 nm, with 20 nm being an example. The wavelengths may be around 1550 nm. For example, the wavelength of the first beam may be 1570 nm and the wavelength of the QKD photons may be 1550 nm.

Figure 2:
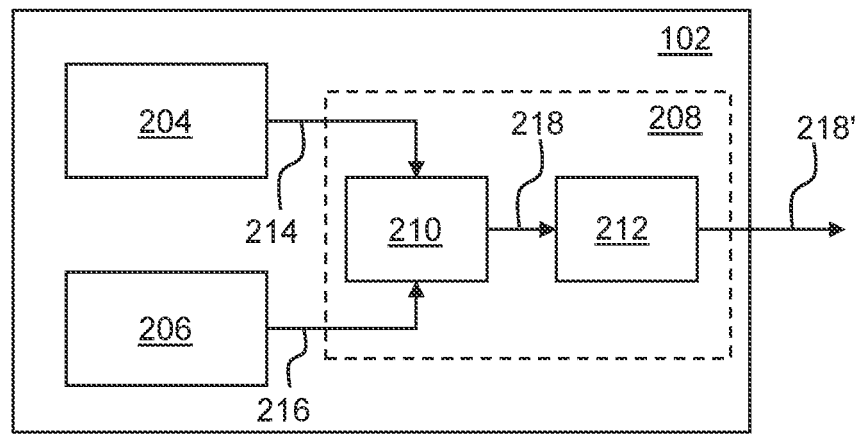
FIG. 2 is a schematic diagram illustrating a FSO communications transmitter terminal according to an example.

Referring to FIG. 2, there is illustrated a FSO communications transmitter terminal 102 according to an example. The FSO communications transmitter terminal 102 may be used as the FSO communications transmitter terminal 102 described above with reference to FIG. 1.

The transmitter terminal 102 comprises a first optical source 204, a second optical source 206, and a first optics arrangement 208.

The first optical source 204 is arranged to provide a first beam of light 214 encoding information to be communicated. For example, the first beam 214 may provide the classical channel between the transmitter 102 and receiver 104 as described above. The first optical source 204 may comprise a laser and the first beam 214 may be a laser beam. In some examples, the first optical source 104 may be configured to modulate the first beam 214 so as to encode the information to be communicated onto the first beam 214. A secret key, for example as produced or shared by QKD as described herein, may be used to encrypt the information encoded onto the first beam 214.

The second optical source 206 is arranged to provide photons 216 encoding bits of a key of a Quantum Key Distribution (QKD) protocol. For example, the photons 216 may provide the QKD channel between the transmitter 102 and the receiver 104 as described above. The photons 216 encoding bits of a key of the Quantum Key Distribution (QKD) protocol are referred to herein as QKD photons 216. The second optical source 206 may comprise a single photon source 206. In some examples, the second optical source 206 may comprise a laser and an attenuation system configured to attenuate a beam produced by the laser so as to provide one photon per pulse. Any one of a number of example QKD protocols may be used. The second optical source 206 may be configured to provide QKD photons 216 according to the QKD protocol used. In some examples, the QKD protocol may be based on one or both of time bin encoding and phase shift encoding. For example, the Quantum Key Distribution protocol may be one of: a BB84 protocol based on time bin encoding and phase shift encoding, a Differential Phase Shift protocol, and a Coherent One Way protocol (these examples are described in more detail below). The second optical source 206 may be configured to provide the QKD photons 216 according to any one of these example protocols. Some example QKD protocols may make use of time synchronization between the transmitter 102 and the receiver 104. For example, where the QKD protocol is based on time-binning to encode bits of the secret key, it may be useful to synchronize precisely a time reference of the transmitter 102 and the receiver 104. In some examples, the first optical source 204 may be arranged to additionally encode a synchronization signal for use in the Quantum Key Distribution protocol onto the first beam 214. This may make efficient use of the first beam 214.

The first beam 214 provided by the first optical source 204 has a first linear polarization and the QKD photons 216 provided by the second optical source 206 has a second linear polarization. In some examples, the first linear polarization may be orthogonal to the second linear polarization, for example horizontally and vertically polarized, respectively.

The first optics arrangement 208 is configured to combine the first beam 214 and the photons 216 into a single, second, beam 218' to be transmitted to a target (e.g. receiver terminal 104); and transform the first linear polarization of the first beam 214 into one of left and right circular polarization and transform the second linear polarization of the photons 216 into the other of left and right circular polarization. In some examples, the first optics arrangement 208 may be implemented in fiber, i.e. using fiber optic cables and/or elements embedded in fiber optic cables.

In this example, the first optics arrangement 208 comprises a combiner 210 arranged to combine the first beam 214 and the photons 216 into a single, second, beam 218. In this example, the first optics arrangement 208 comprises a quarter wave plate 212 onto which the second beam 218 is incident in use and arranged to transform the first linear polarization of the first beam 214 into one of left and right circular polarization and transform the second linear polarization of the QKD photons 216 into the other of left and right circular polarization. For example, the combiner 210 may be provided by a polarization beam combiner 210. The combiner 210 takes as input the first beam 214 and the QKD photos 216 and combines them to output a single, second, beam 218. In this example, in the second beam 218 output by the combiner 210, the first beam 214 and the QKD photons 216 are linearly polarized, and the linear polarization of the first beam 214 is orthogonal to the linear polarization of the QKD photons 216. The second beam 218 is orientated relative to the quarter wave plate 212 so as to transform the first linear polarization of the first beam 214 into one of left and right circular polarization and transform the second linear polarization of the QKD photons 216 into the other of left and right circular polarization. For example, the first linear polarization of the first beam 214 and the second linear polarization of the QKD photons 216 may be orthogonal to one another and each arranged to make a 45 degree angle with the fast axis of the quarter wave plate 212. The output second beam 218' output from the quarter waveplate 212 may be directed towards a target such as a receiver terminal (not shown in FIG. 2). In this arrangement, only one quarter wave plate 212 need be used to provide the second beam 218' having the orthogonal circular polarizations, which may reduce space and weight compared to, for example, if the circular polarizations were prepared before combining of the first beam 214 and the QKD photons 216 in which case multiple waveplates would need to be used.

In some examples, the first beam 214 has a first wavelength and the photons 216 have a second wavelength different to the first wavelength. For example, a difference in wavelength between the first wavelength and the second wavelength may be in the range 10 nm to 30 nm. For example, a difference in wavelength between the first wavelength and the second wavelength may be 20 nm. The wavelengths may be around 1550 nm. For example, the wavelength of the first beam may be 1570 nm and the wavelength of the QKD photons may be 1550 nm. In some examples, the first optical source 204 may be configured to produce the first beam 214 having the first wavelength, and the second optical source 206 may be configured to produce the QKD photons 216 having the second wavelength. As described above, this may allow for even more effective separation of the QKD and classical channels while using similar wavelengths for the first beam 214 and the QKD photons 216 and hence retaining the advantages of similar propagation through the atmosphere and sharing of bulk optics.

Figure 3:
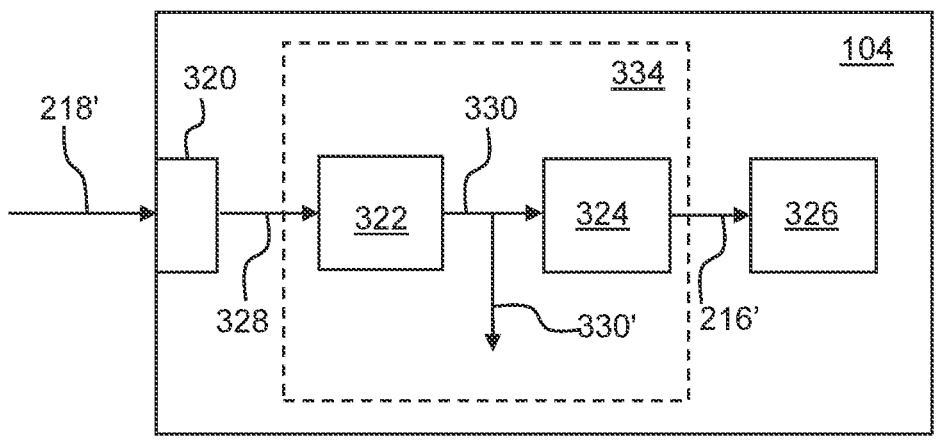
FIG. 3 is a schematic diagram illustrating a FSO communications receiver terminal according to an example.

Referring to FIG. 3, there is illustrated a FSO communications receiver terminal 104 according to an example. The FSO communications receiver terminal 104 may be used as the FSO communications receiver terminal 104 described above with reference to FIG. 1.

The receiver terminal 104 comprises a receiver 320, a second optics arrangement 334, and a single photon detector 326.

The receiver 320 is configured to receive the second beam 218' transmitted by the transmitter terminal 102. That is, the receiver arranged to receive a second beam 218' comprising a first beam of light 214 encoding information being communicated and photons 216 encoding bits of a key of a Quantum Key Distribution protocol, the first beam 214 having a first circular polarization and the photons 216 having a second circular polarization, the first circular polarization being one of right and left circular polarization and the second circular polarization being the other of right and left circular polarization. For example, the receiver 320 may comprise an aperture and/or a fiber coupling arrangement (not shown) arranged to couple the free space second beam 218' into a fiber optic cable (not shown). The receiver 320 outputs a received second beam 328 to the first optics arrangement 334. The respective circular polarizations of the first beam 214 and the QKD photons 216 are maintained in the output 328 of the receiver 320.

The second optics arrangement 334 is configured to transform the first circular polarization of the first beam 214 into a first linear polarization and transform the second circular polarization of the photons 216 into a second linear polarization, the first linear polarization being orthogonal to the second linear polarization. The second optics arrangement 334 is further configured to filter the second linear polarization from the first linear polarization so as to filter out the first beam 214 from the second beam 218' and allow the photons 216' encoding the bits of the key of the Quantum Key Distribution protocol to pass. In some examples, the first optics arrangement 208 may be implemented in fiber, i.e. using fiber optic cables and/or elements embedded in fiber optic cables.

In this example, the second optics arrangement 334 comprises a quarter wave plate 322 onto which the received second beam 328 is incident and arranged to transform the first circular polarization of the first beam 214 into the first linear polarization and transform the second circular polarization of the photons 216 into the second linear polarization, orthogonal to the first linear polarization. The output of the quarter wave plate 322 is a beam 330 comprising the first beam having a first linear polarization and the QKD photons 216 having a second linear polarization orthogonal to the first linear polarization. The output first and second linear polarizations are at 90 degrees to one another and each at 45 degrees to the fast axis of the quarter wave plate 332.

In this example, the second optics arrangement 104 comprises a polarization filter 324, i.e. a linear polarizer 324, to filter the second linear polarization from the first linear polarization. The output beam 330 from the quarter waveplate 332 is incident on the polarization filter 324. The quarter waveplate 332 and the polarization filter 324 may be rotationally aligned relative to one another such that the first linear polarization of the first beam 214 is 90 degrees to the linear polarization axis of the polarization filter so as to filter out the first beam 214, and the second linear polarization of the QKD photons 216 is parallel with the linear polarization axis of the polarization filter 324 so as to allow the QKD photons to pass.

The single photon detector 326 is arranged to detect the QKD photons 216' allowed to pass by the second optics arrangement 334. For example, the QKD photons 216' allowed to pass through the polarization filter 324 may be incident on the single photon detector 326. The single photon detector 326 may communicate detection of the QKD photons 216' to a QKD processor (not shown in FIG. 3) which may determine a secret key from the bits of that secret key as encoded by the QKD photons 216'. A part 330' of the received second beam 328, for example a part 330' of the second beam 330 as output from the quarter wave plate 322, may be split off and directed to a classical detector arrangement (not shown in FIG. 3) arranged to decode the information encoded onto and carried by the first beam 214. Accordingly, the QKD photons 216 may be effectively separated from the first beam 214, and hence the QKD channel effectively separated from the classical channel. The linear polarizer 324 may also help to remove background light from the second beam 330, for example sunlight. This may help allow the FSO communications to be conducted in daylight.

Figure 4:
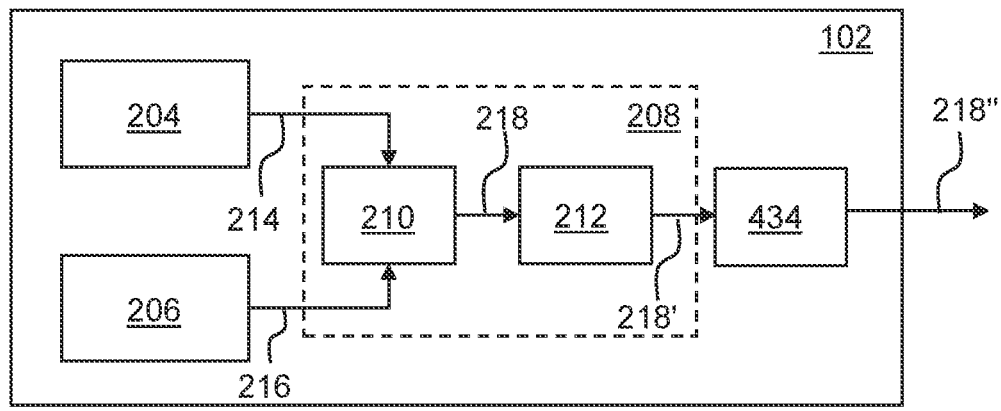
FIG. 4 is a schematic diagram illustrating a FSO communications transmitter terminal according to another example.

Referring now to FIG. 4, there is illustrated a transmitter terminal 102 according to another example. The transmitter terminal 102 of FIG. 4 may be used as the transmitter terminal 102 described above with reference to FIG. 1. The transmitter terminal 102 illustrated in FIG. 4 is similar to the transmitter terminal 102 of FIG. 3, and like features are denoted by like reference numerals. Similarly to the transmitter terminal 102 of FIG. 2, the transmitter terminal of FIG. 4 comprises a first optical source 104 that produces the first beam 214, a second optical source 206 that produces QKD photons 216, and a first optics arrangement 208. The first optics arrangement 208 comprises a combiner 210 configured to combine the first beam 214 and the QKD photons 216 into a second beam 218, and a quarter wave plate 212 to transform the polarization of the first beam 214 and the QKD photons 216 into left and right (or right and left) hand circularly polarized light, respectively. However, unlike the example transmitter terminal 102 of FIG. 2, the example transmitter terminal 102 of FIG. 4 further comprises a further optics arrangement 434 configured to modify the second optical beam 218' from the first optical arrangement 208 for transmission to the target (e.g. the receiver terminal 104).

The further optics arrangement 434 may comprise one or more of conditioning optics, fast steering optics, and beam expanding optics. These optical elements may be used for improving the suitability of the second beam 218' for transmission to the receiver terminal 104 and/or for directing the second beam output therefrom 218" to the receiver terminal 104. The second beam 218', comprising the first beam 214 and the QKD photons 216, is input to the further optics arrangement 434. The further optics arrangement 434 is shared by or common to the first beam 216 and the QKD photons 216. For example, this may be particularly suitable in cases where the wavelength of the first beam 214 and the wavelength of the QKD photons are similar, for example differ in the range 10 nm-30 nm, for example differ by 20 nm. The further optics arrangement 434 being shared by or common to the first beam 214 and the QKD photons 216 may reduce the weight and or space of the FSO communication terminals 102, 104, as compared to providing separate such further optics arrangements for each of the first optical beam 214 and the QKD photons 216. The reduction in space and/or weight may be particularly important for implementation in vehicles, especially in aircraft such as drones and/or spacecraft such as satellites, where space and/or weight of components is to be kept to a minimum, for example to enable the vehicles to operate effectively.

Figure 5:
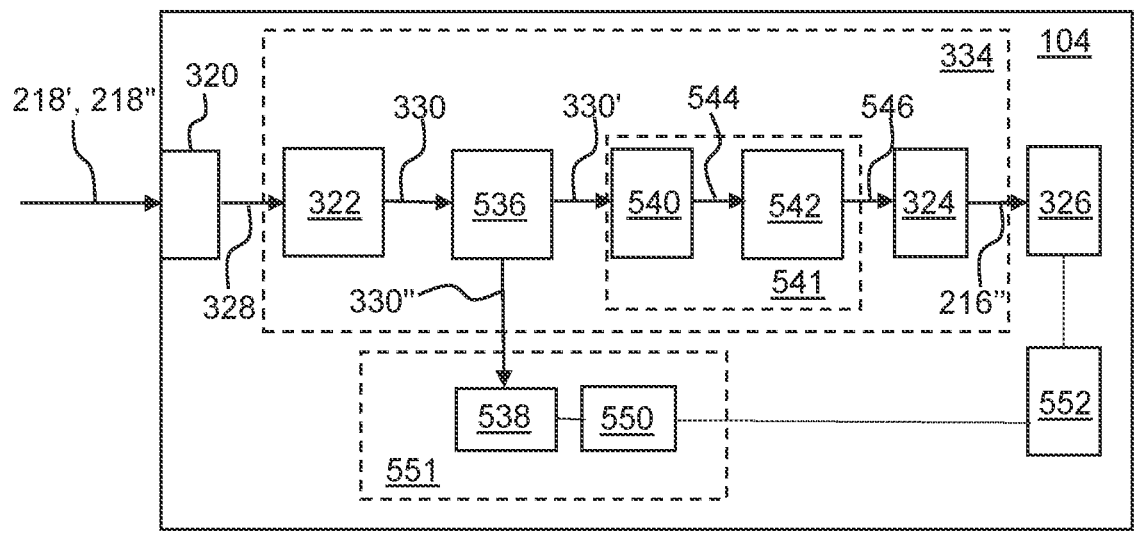
FIG. 5 is a schematic diagram illustrating a FSO communications receiver terminal according to another example.

Referring now to FIG. 5, there is illustrated a receiver terminal 104 according to another example. The receiver terminal 104 of FIG. 5 is similar to the receiver terminal 104 of FIG. 3. Similarly to the receiver terminal 104 of FIG. 3, the receiver terminal 104 of FIG. 5 comprises a receiver arranged to receive the second beam 218',218", a second optics arrangement 334, and a single photon detector 326. The second optics arrangement 334 comprises a quarter wave plate 322 to transform the circular polarizations of the first beam 214 and the QKD photons 216 of the second beam 218, 218" into orthogonal linear polarizations, and a linear polarizer 324 configured to filter out the linear polarization of the first beam 214 and allow to pass to the single photon detector 326 the linear polarization of the QKD photons 216. However, unlike the receiver terminal 104 of FIG. 3, the second optics arrangement 334 of the receiver terminal 104 of FIG. 5 further comprises a wavelength filter arrangement 541 to filter out the wavelength of the first beam 214 and allow the wavelength of the QKD photons 216 to pass to the single photon detector 326.

In some examples, the wavelength of the QKD photons 216 may be known or pre-set. For example, the wavelength of the QKD photons may be 1550 nm. The wavelength of the first beam 214 may be similar to the wavelength of the QKD photons, for example differ in the range 10 nm to 30 nm. For example, the wavelength of the first beam 214 may be 1570 nm. The wavelength filter arrangement 541 may be configured or pre-set to allow the pre-set wavelength of the QKD photons 216 to pass, and to filter out any other wavelength. In some examples, the wavelength filter arrangement 541 may be configured to filter out background light from the second beam 330'. In some examples, the wavelength filter arrangement 541 may comprise two wavelength filter elements 540, 542. The two wavelength filter elements 540, 542 may act together to attenuate the first beam 214 and background light (e.g. from the sun) from the second beam 218, 218", allowing substantially only the wavelength of the QKD photons to pass. For example, the wavelength filter arrangement 541 may comprise a two-stage wavelength division multiplexing filter 540, 542 to filter out background light and the first beam 214 from the second beam 218',218" and allow the QKD photons 216" to pass. In the example of FIG. 5, the wavelength filter arrangement 541 takes as input the second beam 300 output from the quarter wave plate 536 (and having passed through a beam splitter 536 in the illustrated example), and outputs a second beam 546 comprising the first beam 214 and the QKD photons 216 having orthogonal linear polarizations and in which the first beam 214 and any background light is much attenuated due to the wavelength filtering. This second beam 546 is output to the linear polarizer 324. The linear polarizer 324 reduces any remaining part of the first beam 214 and/or background light to negligible levels and allows only the QKD photons 216" to pass to the photon detector 326. The combination of the wavelength filtering and the polarization filtering may allow for particularly effective separation (e.g. 70 dB) between the classical and QKD channels, whilst still allowing similar wavelengths to be used for the first beam 214 and the QKD photons 216.

In some examples, such as that shown in FIG. 5, the second optics arrangement 334 of the receiver terminal 104 is shared by the first beam 214 and the QKD photons 216. This may be particularly effective when the wavelength of the first beam 214 and the QKD photons 216 is similar, for example in the range 10 nm to 30 nm. Sharing of the second optics arrangement 334 may save weight and space, for example as compared to providing a separate optics arrangement for each of the first beam 214 and the QKD photons 216, which may be particularly beneficial when applied to vehicles such as aircraft and/or spacecraft where weight and/or space is to be kept to a minimum.

In some examples, such as that shown in FIG. 5, the receiver terminal 104 comprises a classical detector arrangement 551 comprising a further detector 538 arranged to detect the first beam 214 and a decoder 550 arranged to decode the information carried by the first beam 214. In some examples, such as that shown in FIG. 5, the second optics arrangement 334 of the receiver terminal 104 comprises a beam splitter 536 to route a portion 330" of the received second beam 330 to the further detector 538 arranged to detect the first beam 214. In this example, the beam splitter 536 is placed intermediate of the quarter wave plate 322 and the wavelength filter arrangement 541. In some examples, such as that shown in FIG. 5, the receiver terminal 104 comprises a QKD processor 552 arranged to determine or establish a secret key from the QKD photons 216" detected by the single photon detector 326.

In the example shown in FIG. 5, the second beam 218', 218" transmitted from a transmitter terminal (not shown in FIG. 5) is received by the receiver 320. The received second beam 328 output from the receiver 320 is input to the quarter wave plate 322, which transforms the received second beam 328 such that the first beam 214 and the QKD photons 216 have orthogonal linear polarizations. This second beam 330 output from the quarter waveplate 322 is input to the beam splitter 536 which splits this second beam 330 into two parts 330',330". A first 330" of these parts is routed to the classical detector 538 for decoding of the information carried by the first beam 214, and a second of these parts 330' is input to the wavelength filter arrangement 541. A first wavelength filter element 540 is applied to the second part of the second beam 330' to filter out wavelengths other than that of the QKD photons 216, and which outputs a second beam 544 in which the first beam 214 and any background light is attenuated. This output second beam 544 is input to a second wavelength filter element 542 to filter out wavelengths other than that of the QKD photons 216, and which outputs a second beam 546 having the QKD photons and only residual levels of background light. This second beam 546 is input to the polarization filter 324 to remove any residual background light and any residual parts of the first beam 214, and to output the QKD photons 216" with a negligible level of background or first beam 214. These QKD photons 216" are routed to the single photon detector 326 which detects the QKD photons 216". A detection signal is sent from the single photon detector 326 to the QKD processor 552, and the QKD processor 552 may use these signals to establish a secret key being shared or established with the transmitter 102. Accordingly, the QKD photons can be successfully detected (and hence the QKD key established) despite a relatively high powered first beam 214 for the classical communications channel and with both the QKD photons 216 and the first beam 214 being routed through the same optical train, and despite operation in the presence of background light such as sun light, and while allowing for the first beam and the QKD photons to have similar wavelengths and hence prorogating similarly through the atmosphere.

The information encoded onto and carried by the first beam 214 may be encrypted according to a secret key established or shared via the QKD photons 216 and determined by the QKD processor 552, and the QKD processor 552 may provide the secret key to the decoder 550 of the classical detector arrangement 551 in order to decrypt the information. This may provide for secure FSO communications between the terminals 102, 104. Alternatively or additionally, in some examples, as mentioned above, the first beam 214 may encode a synchronization signal for use in the Quantum Key Distribution protocol, and the classical detector arrangement 551 may pass the synchronization signal determined from the first beam 214 to the QKD processor 552 for the QKD processor 552 to use in determining or establishing the secret key from the QKD photons 216. This may provide efficient use of the first beam 214.

As mentioned above, any one of a number of QKD protocols may be used. In some examples, the Quantum Key Distribution protocol may be based on one or both of time bin encoding and phase shift encoding. For example, the QKD protocol may be one of a BB84 protocol based on time bin encoding and phase shift encoding, a Differential Phase Shift protocol, and a Coherent One Way protocol. Using a QKD protocol based on one or both of time bin encoding and phase shift encoding may avoid any issue of the polarization transformation at the transmitter terminal 102 or the receiver terminal 104 affecting the encoding of the QKD photons. For example, this may be as compared to a case in which a QKD protocol based on polarization encoding is used.

In a BB84 QKD protocol, there are two bases of two quantum states $|0\rangle$, $|1\rangle$, $|+\rangle$, $|-\rangle$, the states within a given basis being orthogonal to one another, and the bases being conjugate to one another. At a transmitter, a random bit is encoded onto a photon according to a random one of the bases and transmitted to a receiver. At the receiver, a random one of the bases is selected and the received photon decoded in this basis. This process is repeated n times. After this, the transmitter broadcasts the basis according to which each of the n photons was encoded and the receiver broadcasts the basis according to which each of the n photons was decoded. Both the transmitter and the receiver discard bits where the encoding and decoding bases was different. On average, half of the n bits remain, and these can be used as the secret key. If it is detected that less or significantly less than half of the bits are discarded, the presence of an eavesdropper may be implied, and the communication aborted.

In a BB84 protocol based on time bin encoding and phase shift encoding, the quantum states used may be as follows: $|0\rangle$ is encoded by a photon sent in a first time bin, $|1\rangle$, is encoded by a photon sent in a second time bin, $|+\rangle$ is encoded by a photon in a superposition of being in the first and second time bin with a zero relative phase shift, and $|-\rangle$ is encoded by a photon in a superposition of being in the first and second time bin with $\pi$ relative phase shift. In these examples the second optical source 206 may comprise a modulated laser configured to emit photons in the first or second time bin, and an electro-optic modulator configured to randomize the phase difference, in order to encode the bits. In these examples, the single photon detector 326 may comprise a delay line configured to match a time interval between successive time bins, and a phase decoding interferometer, in order to decode the bits.

In a Differential Phase Shift (DPS) protocol, at a transmitter, a coherent pulse train is generated and is randomly phase modulated by 0 or $\pi$ for each pulse. The power of the pulse train set such that that the average photon number per pulse is less than one, e.g. 0.2. A receiver receives the pulse train with a one-pulse delay interferometer outputting onto two detectors. In the interferometer, adjacent pulses in the train interfere with one another and are detected according to their phase difference, e.g. a first detector counts for a phase difference of 0 (encoding e.g. a 0 bit) and a second detector counts of a phase difference of $\pi$ (encoding e.g. a 1 bit). Photon detection occurs randomly because of the small number of photons in the pulse train. The sequence of detected bits forms the secret key. The receiver broadcasts the photon detection times to the transmitter. With this time information and the knowledge of the random phase modulation, the transmitter determines which of the two detectors will have been activated at the receiver in which order, and hence determine the secret key. In this example, the second optical source 106 of the transmitter terminal 102 may comprise a pulsed laser and a phase modulator. In this example, the single photon detector 326 of the receiver terminal 104 may comprise a one-pulse delay interferometer and two detectors arranged to detect the different phase differences as mentioned above.

In a Coherent One Way (COW) protocol, at a transmitter, a sequence of coherent pulses is generated, and bits are encoded using time bins containing either 0 photons (i.e. a 0 pulse) or $\mu$ photons (i.e. a $\mu$ pulse), where on average $\mu<1$, typically 0.5. A 0 bit is encoded by a pair having the sequence 0, $\mu$; whereas a 1 bit is encoded by a pair having the sequence $\mu$, 0. For security reasons, the transmitter also sends decoy pairs having the sequence $\mu$, $\mu$. A receiver registers the arrival time of the photons on a first detector, and from this determines a raw key. For security reasons, the receiver also includes an interferometer having a one time bin delay line and a further detector, to measure coherence between successive $\mu$, 0, or decoy, sequences. The transmitter broadcasts to the receiver the raw key and also the time of the detections on the further detector. From a knowledge of the timing of the transmission of the $\mu$, 0 and decoy sequences, and from the timing of the detections on the further detector, the transmitter can determine whether or not there has been a loss of coherence between the successive sequences, and whether or not an eavesdropper was present. If coherence is lost and an eavesdropper is detected, the raw key can be discarded. If no eavesdropper is detected, the transmitter removes the decoy bits from the raw key to obtain the secret key. The transmitter also broadcasts to the receiver the times at which the decoy sequences were included so that the receiver can remove these from the raw key, to obtain the secret key. In this example, the second optical source 106 of the transmitter terminal 102 may comprises a pulsed laser source, such as a Continuous Wave laser with a temporal modulation unit. In this example, the single photon detector 326 of the receiver terminal 104 may comprise a first detector arranged to detect photons, a one time bin delay interferometer and a further detector arranged to detect coherence between successive $\mu$, 0, or decoy, sequences, as mentioned above.

In these example QKD protocols, use may be made of a time synchronization between the transmitter terminal 102 and the receiver 104, e.g. to precisely synchronize a time reference of the transmitter 102 and the receiver 104. In these examples, the first optical source 204 may be arranged to encode a synchronization signal for use in the Quantum Key Distribution protocol onto the first beam 214. This may make efficient use of the first beam 214. In some examples, a time synchronization signal may be communicated between the terminals via another means, such as via satellite link.

It will be appreciated that these are examples of QKD protocols that may be used and that other examples may be used instead. In each case, the second optical source 106 of the transmitter terminal 102 and the single photon detector 326 of the receiver terminal 104 may be adapted as appropriate to implement the protocol.

Figure 6:
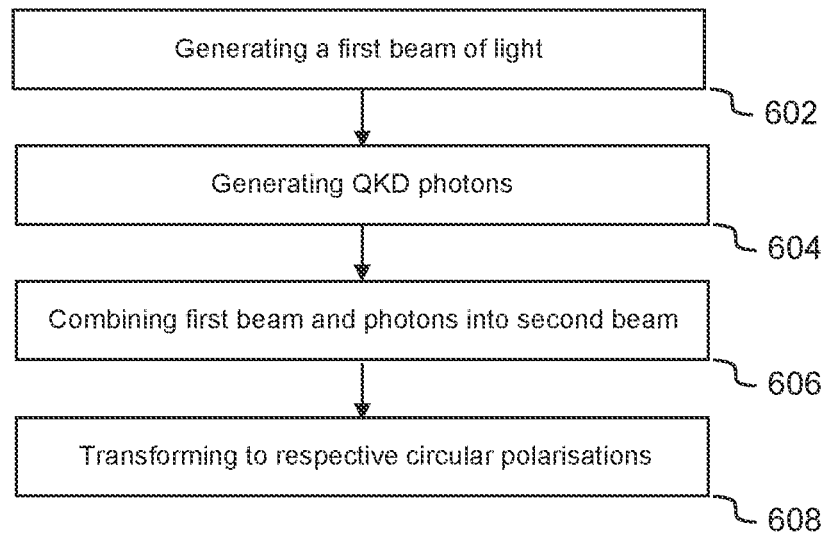
FIG. 6 is a flow diagram illustrating a method of operating a FSO communications transmitter terminal according to an example.

Referring to the flow diagram of FIG. 6, an example method for free space optical communications is illustrated. The method may be carried out by a FSO communications terminal, such as the FSO communications transmitter terminal 102 described above with reference to FIG. 1, 2 or 4.

The method comprises, in step 602, generating a first beam of light encoding information to be communicated, the first beam having a first linear polarization. For example, the first beam may be the first beam 214 according to any of the examples described above with reference to FIGS. 1 to 5 and may be generated according to any of those examples.

The method comprises, in step 604, generating photons encoding bits of a key of a Quantum Key Distribution protocol, the photons having a second linear polarization. For example, the photons may be the QKD photons 216 according to any of the examples described above with reference to FIGS. 1 to 5 and may be generated according to any of those examples.

The method comprises, in step 606, combining the first beam 214 and the photons 216 into a single, second, beam to be transmitted to a target (e.g. the receiver terminal 104). For example, the second beam may be the second beam 218',218" according to any of the examples described above with reference to FIGS. 1 to 5 and may be produced according to any of those examples.

The method comprises, in step 608, transforming the first linear polarization of the first beam 214 into one of left and right circular polarization and transforming the second linear polarization of the photons 216 into the other of left and right circular polarization. For example, the transformation from linear to circular polarization of the first beam 214 and the QKD photons 216 may be as for any of the examples described above with reference to FIGS. 1 to 5.

Figure 7:
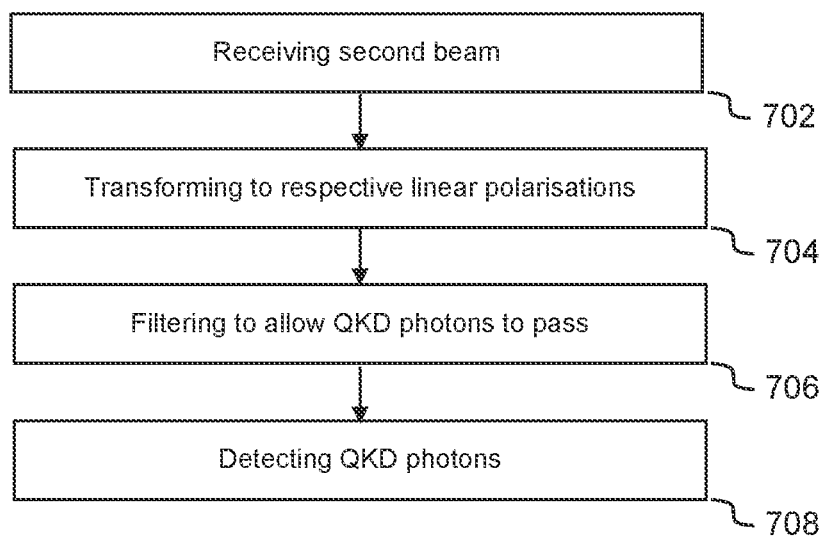
FIG. 7 is a flow diagram illustrating a method of operating a FSO communications receiver terminal according to an example.

Referring to the flow diagram of FIG. 7, an example method for free space optical communications is illustrated. The method may be carried out by a FSO communications terminal, such as the FSO communications receiver terminal 104 described above with reference to FIGS. 1 to 5.

The method comprises, in step 702, receiving a second beam 218',218" comprising a first beam of light 214 encoding information being communicated and photons 216 encoding bits of a key of a Quantum Key Distribution protocol, the first beam 214 having a first circular polarization and the photons 216 having a second circular polarization, the first circular polarization being one of right and left circular polarization and the second circular polarization being the other of right and left circular polarization. For example, the second beam may be the second beam 218', 218" according to any of the examples described above with reference to FIGS. 1 to 6.

The method comprises, in step 704, transforming the first circular polarization of the first beam 214 into a first linear polarization and transforming the second circular polarization of the photons 216 into a second linear polarization, the first linear polarization being orthogonal to the second linear polarization. For example, the transformation from circular polarizations to orthogonal linear polarizations may be as for any of the examples described above with reference to FIGS. 1 to 5.

The method comprises, in step 706, filtering the second linear polarization from the first linear polarization so as to filter out the first beam 214 from the second beam 218',218" and allow the photons 216 encoding the bits of the key of the Quantum Key Distribution protocol to pass. For example, the polarization filtering may be as for any of the examples described above with reference to FIGS. 1 to 5.

The method comprises, in step 708, detecting the photons 216" encoding the bits of the key of the Quantum Key Distribution protocol allowed to pass. For example, the detection of the QKD photons may be as for any of the examples described above with reference to FIGS. 1 to 5.

In some examples, the methods described above with reference to FIGS. 6 and 7 may be combined to provide an overall method of free space optical communications. For example, the overall method may be performed by a first terminal and a second terminal. For example, the first terminal may be the FSO communications transmitter terminal 102 described above, and the second terminal may be the FSO communications receiver terminal 104 described above. In these examples, the overall method may comprise, at a first terminal 102: generating a first beam of light 214 encoding information to be communicated, the first beam having a first linear polarization; generating photons 216 encoding bits of a key of a Quantum Key Distribution protocol, the photons having a second linear polarization; combining the first beam 214 and the photons 216 into a single, second, beam 218' 218"; transforming the first linear polarization of the first beam 214 into one of left and right circular polarization and transforming the second linear polarization of the photons 216 into the other of left and right circular polarization; and transmitting the second beam to a second terminal 104; and at the second terminal 104: receiving the second beam 218, 218"; transforming the first circular polarization of the first beam 214 into a first linear polarization and transforming the second circular polarization of the photons 216 into a second linear polarization, the first linear polarization being orthogonal to the second linear polarization; filtering the second linear polarization from the first linear polarization so as to filter out the first beam 214 from the second beam 218',218" and allowing the photons 216 encoding the bits of the key of the Quantum Key Distribution protocol to pass; and detecting the photons 216" encoding the bits of the key of the Quantum Key Distribution protocol allowed to pass.

In some examples, the methods may comprise, at the transmitter terminal 102, generating the first beam 214 to have a first wavelength and generating the QKD photons 216 to have a second wavelength, for example differing in the range 10 nm to 30 nm, for example 20 nm, and/or the methods may further comprise, at the receiver terminal 104, filtering the first wavelength of the first beam 214 from the second beam 218, 218" and allowing the second wavelength of the QKD photons 216 to pass for detection.

Figure 8:
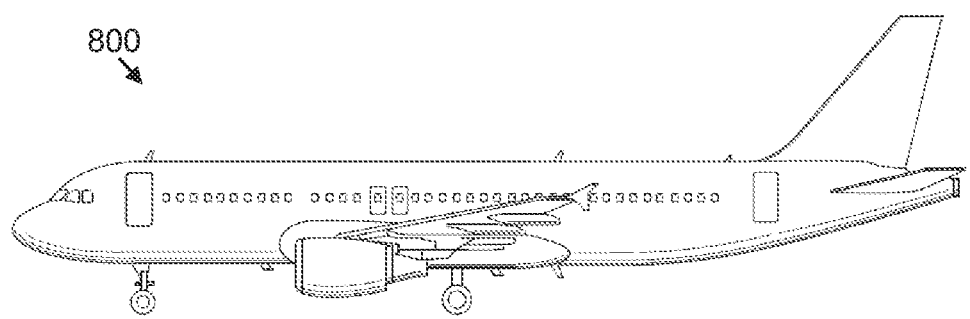
FIG. 8 is a schematic diagram illustrating a vehicle according to an example.

In some examples, a vehicle may be provided with the FSO transmitter terminal 102 and/or the FSO receiver terminal 104 as per any of the examples described above with reference to FIGS. 1 to 7. For example, the FSO communications transmitter terminal 102 and/or the FSO communications receiver terminal 104 may be mounted to an exterior of the vehicle. In some examples, the vehicle may be an aircraft, such as an airplane or a drone or a high-altitude aircraft. The vehicle may alternatively or additionally be a spacecraft, such as a satellite. FIG. 8 illustrates an example vehicle, in this case an aircraft 800, with which the example FSO communication terminals 102, 104 described herein (not shown in FIG. 8) may be used. Providing a vehicle/aircraft/spacecraft with one or both of the FSO terminals 102, 104 may allow the vehicle/aircraft/spacecraft to communicate securely with other vehicles/aircraft/spacecraft and/or ground based units. For example, a network of aircraft/spacecraft may be deployed to provide secure FSO communications over a wide area. The reduced space and/or weight provided by examples of the FSO terminals 102, 104 described herein may be of particular importance in aircraft and spacecraft, particularly in light weight and/or small aircraft/spacecraft such as drones and/or satellites, where space weight and power budgets are limited.

According to a further example aspect, there may be provided a free space optical communications transmitter terminal comprising: a first optical source (e.g. the first optical source 204 described above) arranged to provide a first beam of light encoding information to be communicated (e.g. the first beam 214 described above), the first beam of light having a first wavelength; a second optical source (e.g. the second optical source 206 describe above) arranged to provide photons (e.g. the QKD photons 216 described above) encoding bits of a key of a Quantum Key Distribution protocol, the photons having a second wavelength; wherein a difference in wavelength between the first wavelength and the second wavelength is in the range 10 nm to 30 nm. There may be provided a method of free space optical communications comprising: transmitting a first beam 214 of light encoding information to be communicated, the first beam of light having a first wavelength; transmitting photons 216 encoding bits of a of a key of a Quantum Key Distribution protocol, the photons having a second wavelength; wherein a difference in wavelength between the first wavelength and the second wavelength is in the range 10 nm to 30 nm. For example, the wavelength difference may be 20 nm. For example, the wavelengths may be around 1550 nm. For example, the first wavelength may be 1570 nm and the second wavelength may be 1550 nm. Providing a wavelength difference in the range 10 nm to 30 nm may allow for similar propagation of the first beam 214 and the QKD photons 216 through the atmosphere, and hence that both the first beam 214 and the QKD photons 216 may more effectively and/or precisely reach a receiver. This may, in turn, improve the effectiveness and/or the range of an FSO communications system. Further, providing a wavelength difference in the range 10 nm to 30 nm may allow bulk optics of the transmitter terminal and/or a receiver terminal to be shared by or common to the first beam 214 and QKD photons 216. For example, for the transmitter, the bulk optics may include optics used for transmission of the optical beam to the receiver terminal, such as beam conditioning optics, fast steering optics, and beam expanding optics, and these may be shared by or common to the first beam 214 and the QKD photons 216. This may in turn reduce the weight and or space of the FSO communication terminals which can be particularly important for implementation in vehicles, especially in aircraft such as drones and/or spacecraft such as satellites, where space and/or weight of components is to be kept to a minimum, for example to enable the vehicles to operate effectively. On the other hand, providing a wavelength difference in the range 10 nm to 30 nm may allow for effective wavelength filtering to be applied at the receiver, and hence for separation between a classical channel carried by the first beam 214 and a quantum channel carried by the QKD photons 216. The inventors have found that the range of wavelength difference that allows for channel separation through wavelength filtering, while still enabling good atmospheric propagation similarity and effective sharing of bulk optics, is 10 nm to 30 nm, with 20 nm being an example.

It is to be noted that the term "or" as used herein is to be interpreted to mean "and/or", unless expressly stated otherwise.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A free space optical communications transmitter terminal comprising:
   a first optical source arranged to provide a first beam of light encoding information to be communicated, the first beam having a first linear polarisation;
   a second optical source arranged to provide photons encoding bits of a key of a Quantum Key Distribution protocol, the photons having a second linear polarisation; and
   a first optics arrangement configured to:
      combine the first beam and the photons into a single, second beam to be transmitted to a target; and
      transform the first linear polarisation of the first beam into one of a left circular polarisation and a right circular polarisation, and transform the second linear polarisation of the photons into the other of the left circular polarisation and the right circular polarisation.

2. The free space optical communications transmitter terminal according to claim 1, wherein the first beam has a first wavelength, and the photons have a second wavelength different to the first wavelength.

3. The free space optical communications transmitter terminal according to claim 2, wherein a difference in wavelength between the first wavelength and the second wavelength is in a range of 10 nm to 30 nm.

4. The free space optical communications transmitter terminal according to claim 1, wherein the second linear polarisation is orthogonal to the first linear polarisation.

5. The free space optical communications transmitter terminal according to claim 1, wherein the first optics arrangement further comprises:
   a quarter wave plate onto which the second beam is incident in use and arranged to transform the first linear polarisation into one of a left circular polarisation and a right circular polarisation, and transform the second linear polarisation into the other of the left circular polarisation and the right circular polarisation.

6. The free space optical communications transmitter terminal according to claim 1, further comprising a further optics arrangement configured to modify the second optical beam from the first optical arrangement for transmission to said target.

7. The free space optical communications transmitter terminal according to claim 6, wherein the further optics arrangement comprises one or more of conditioning optics, fast steering optics, and beam expanding optics.

8. The free space optical communications transmitter terminal according to claim 1, wherein the first optical source is arranged to encode a synchronisation signal for use in the Quantum Key Distribution protocol onto the first beam.

9. The free space optical communications transmitter terminal according to claim 1, wherein the Quantum Key Distribution protocol is based on one or both of time bin encoding and phase shift encoding.

10. A free space optical communications system comprising the free space optical communications transmitter terminal according to claim 1.

11. A vehicle comprising the free space optical communications transmitter terminal according to claim 1.

12. The vehicle according to claim 11, wherein the vehicle is one or both of an aircraft and a spacecraft.

13. A free space optical communications receiver terminal comprising:
a receiver arranged to receive a second beam comprising a first beam of light encoding information being communicated and photons encoding bits of a key of a Quantum Key Distribution protocol, the first beam having a first circular polarisation and the photons having a second circular polarisation, the first circular polarisation being one of a right circular polarisation and a left circular polarisation, and the second circular polarisation being the other of the right circular polarisation and the left circular polarisation;
a second optics arrangement configured to:
transform the first circular polarisation of the first beam into a first linear polarisation and transform the second circular polarisation of the photons into a second linear polarisation, the first linear polarisation is orthogonal to the second linear polarisation; and
filter the second linear polarisation from the first linear polarisation to filter out the first beam from the second beam and allow the photons encoding the bits of the key of the Quantum Key Distribution protocol to pass; and
a single photon detector arranged to detect the photons encoding the bits of the key of the Quantum Key Distribution protocol allowed to pass by the second optics arrangement.

14. The free space optical communications receiver terminal according to claim 13, wherein the first beam has a first wavelength and the photons have a second wavelength different from the first wavelength, wherein the second optics arrangement comprises a wavelength filter arrangement to filter out the first wavelength from the second beam and allow the second wavelength to pass.

15. The free space optical communications receiver terminal according to claim 14, wherein the wavelength filter arrangement is configured to filter out background light from the second beam.

16. The free space optical communications receiver terminal according to claim 14, wherein the wavelength filter arrangement comprises a two-stage wavelength division multiplexing filter configured to filter out background light and the first beam from the second beam, and allow the photons to pass.

17. The free space optical communications receiver terminal according to claim 14, wherein the first wavelength differs from the second wavelength in a range of 10 nm to 30 nm, and the second optics arrangement is shared by the first beam and the photons of the second beam.

18. The free space optical communications receiver terminal according to claim 13, wherein the second optics arrangement comprises a quarter wave plate onto which the received second beam is incident in use and arranged to transform the first circular polarisation of the first beam into the first linear polarisation and transform the second circular polarisation of the photons into the second linear polarisation.

19. The free space optical communications receiver terminal according to claim 13, wherein the second optics arrangement comprises a polarisation filter configured to filter the second linear polarisation from the first linear polarisation.

20. The free space optical communications receiver terminal according to claim 13, wherein the second optics arrangement comprises a beam splitter configured to route a portion of the received second beam to a further detector arranged to detect the first beam.

21. The free space optical communications receiver terminal according to claim 16, further comprising a decoder configured to decode from the detected first beam a synchronisation signal for use in the Quantum Key Distribution protocol.

22. A method for free space optical communications, the method comprising:
generating a first beam of light encoding information to be communicated, the first beam having a first linear polarisation;
generating photons encoding bits of a key of a Quantum Key Distribution protocol, the photons having a second linear polarisation;
combining the first beam and the photons into a single, second beam to be transmitted to a target; and
transforming the first linear polarisation of the first beam into one of a left circular polarisation and a right circular polarisation, and transforming the second linear polarisation of the photons into the other of the left circular polarisation and the right circular polarisation.

23. A method for free space optical communications, the method comprising:
receiving a second beam comprising a first beam of light encoding information being communicated and photons encoding bits of a key of a Quantum Key Distribution protocol, the first beam having a first circular polarisation and the photons having a second circular polarisation, the first circular polarisation being one of a right circular polarisation and a left circular polarisation, and the second circular polarisation being the other of the right circular polarisation and the left circular polarisation;
transforming the first circular polarisation of the first beam into a first linear polarisation and transforming the second circular polarisation of the photons into a second linear polarisation, the first linear polarisation being orthogonal to the second linear polarisation; and
filtering the second linear polarisation from the first linear polarisation to filter out the first beam from the second beam and allow the photons encoding the bits of the key of the Quantum Key Distribution protocol to pass; and
detecting the photons encoding the bits of the key of the Quantum Key Distribution protocol allowed to pass.

24. A method of free space optical communications, the method comprising:
  at a first terminal:
    generating a first beam of light encoding information to be communicated, the first beam having a first linear polarisation;
    generating photons encoding bits of a key of a Quantum Key Distribution protocol, the photons having a second linear polarisation;
    combining the first beam and the photons into a single, second beam;
    transforming the first linear polarisation of the first beam into one of a left circular polarisation and a right circular polarisation, and transforming the second linear polarisation of the photons into the other of the left circular polarisation and the right circular polarisation; and
    transmitting the second beam to a second terminal; and
  at the second terminal:
    receiving the second beam;
    transforming the first circular polarisation of the first beam into a first linear polarisation and transforming the second circular polarisation of the photons into a second linear polarisation, the first linear polarisation is orthogonal to the second linear polarisation;
    filtering the second linear polarisation from the first linear polarisation to filter out the first beam from the second beam and allow the photons encoding the bits of the key of the Quantum Key Distribution protocol to pass; and
    detecting the photons encoding the bits of the key of the Quantum Key Distribution protocol allowed to pass.

* * * * *